United States Patent
Cardone et al.

(10) Patent No.: US 8,704,624 B2
(45) Date of Patent: Apr. 22, 2014

(54) MONOLITHIC MAGNETIC APPARATUS AND PROCESS FOR MAKING SAID MONOLITHIC MAGNETIC APPARATUS

(75) Inventors: Michele Cardone, Trezzano (IT); Giovanni Cosmai, Rescaldina (IT); Roberto Faranda, Milan (IT); Antonino Giglio, Pero (IT)

(73) Assignees: Politecnico di Milano, Milan (MI) (IT); Tecnomagnete S.p.A., Lainate (MI) (IT)

( * ) Notice: Subject to any disclaimer, the term of this patent is extended or adjusted under 35 U.S.C. 154(b) by 0 days.

(21) Appl. No.: 12/988,688

(22) PCT Filed: Apr. 22, 2008

(86) PCT No.: PCT/IT2008/000278
§ 371 (c)(1), (2), (4) Date: Oct. 20, 2010

(87) PCT Pub. No.: WO2009/130721
PCT Pub. Date: Oct. 29, 2009

(65) Prior Publication Data
US 2011/0043310 A1    Feb. 24, 2011

(51) Int. Cl.
*H01F 7/20* (2006.01)
(52) U.S. Cl.
USPC ............................ 335/285; 335/289
(58) Field of Classification Search
USPC .................................. 335/285–289
See application file for complete search history.

(56) References Cited

U.S. PATENT DOCUMENTS 8,031,038 B2 * 10/2011 Kimura ................ 335/285

FOREIGN PATENT DOCUMENTS

| DE | 197 45 930 | 4/1999 |
| IN | 345/KOL/2005 | 3/2010 |
| WO | WO 03/022514 | 3/2003 |
| WO | WO 2007/119245 | 10/2007 |

OTHER PUBLICATIONS

International Search Report for PCT/IT2008/000278, mailed Jan. 26, 2009.
Written Opinion of the International Searching Authority for PCT/IT2008/000278, mailed Jan. 26, 2009.

* cited by examiner

*Primary Examiner* — Shawki S Ismail
*Assistant Examiner* — Lisa Homza
(74) *Attorney, Agent, or Firm* — Nixon & Vanderhye, PC

(57) ABSTRACT

The present invention concerns a magnetic apparatus for magnetic clamping of ferrous elements (P1), comprising a support structure (11) with at least one pole piece (30A) held within its thickness (S), first and second sides (12, 13) being formed in said support structure (11, 11A) at the opposed larger surfaces, said pole piece (30A) comprising at least one first pole piece collector (50), said first pole piece collector (50) being adapted to convey at least one first magnetic flux (F1) generated by said magnetic apparatus to said first side (12, 13). The invention is characterized in that said at least one first pole piece collector (50) is held within the thickness (S) of said support structure (11) and is formed of one piece with said support structure (11).

23 Claims, 10 Drawing Sheets

PRIOR ART

PRIOR ART

MONOLITHIC MAGNETIC APPARATUS AND PROCESS FOR MAKING SAID MONOLITHIC MAGNETIC APPARATUS

This application is the U.S. national phase of International Application No. PCT/IT2008/000278 filed 22 Apr. 2008, which designated the U.S., the entire contents of which is hereby incorporated by reference.

BACKGROUND OF INVENTION

1. Field of the Invention

The present invention relates to a monolithic magnetic apparatus and the process for making such apparatus.

The present invention relates to a monolithic magnetic apparatus and the process for making such apparatus as defined in the preamble of claim 1.

As used herein, the term magnetic apparatus is intended to indicate:
- a permanent-magnet apparatus, i.e. an apparatus that does not require any power supply when used for clamping or for changing its state from active to inactive and vice versa, and is formed with permanent magnets in appropriate arrangement within the apparatus;
- an electro-permanent apparatus, i.e. an apparatus that does not require any power supply when used for clamping and requires power supply when it is activated and inactivated, and is formed with reversible permanent magnets and, if needed, with static permanent magnets in appropriate arrangement within the apparatus;
- an electromagnetic apparatus, i.e. an apparatus that requires power supply when used for clamping, whose magnetic core is made of ferromagnetic material.

2. Description of the Related Art

Figure 1A:
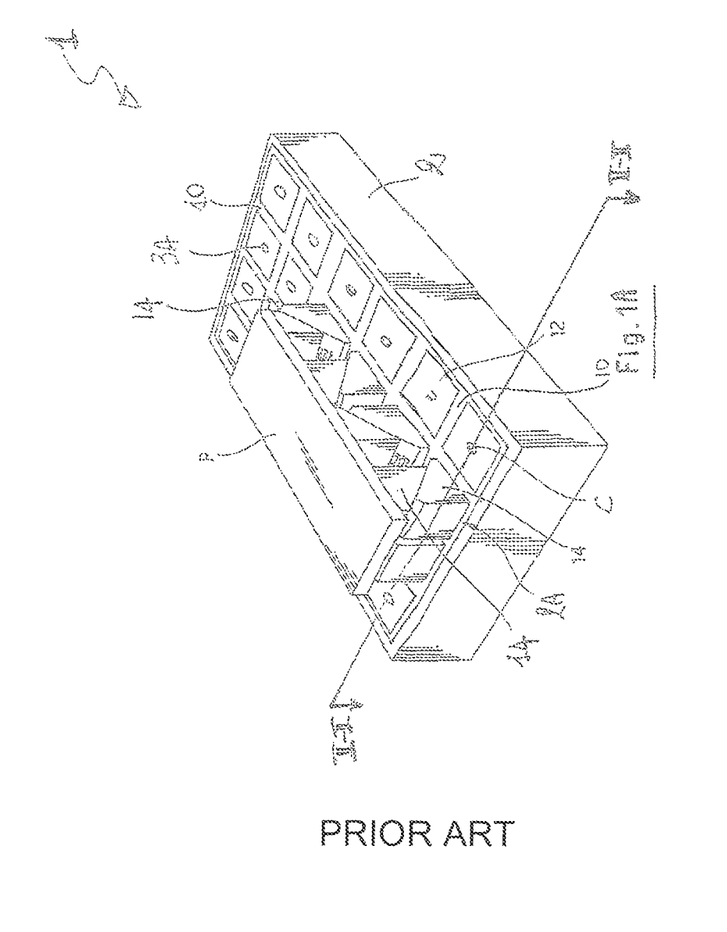
FIG. 1A is perspective view of a prior art magnetic apparatus.
Figure 1B:
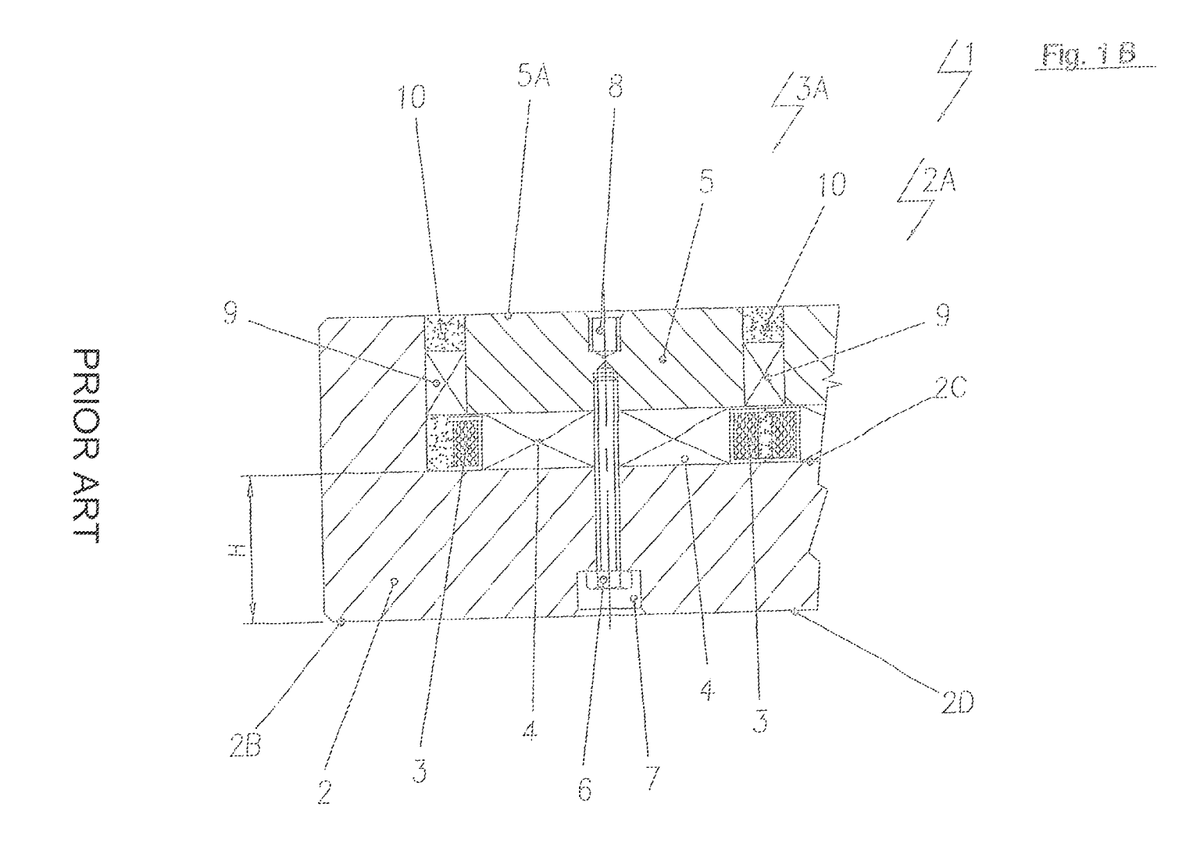
FIG. 1B is a partially sectional view taken along line II-II of the magnetic apparatus of FIG. 1A, when the latter operates in the dual magnet mode.

In prior art, also with reference to FIGS. 1A and 1B, the process for making a magnetic clamping apparatus 1 for example of the electro-permanent dual-magnet type, includes a first step in which a housing 2 is made from a block, to form a bottom 2B, with number "N" of pole pieces 3A arranged on its inner surface 2C.

Otherwise, the housing 2 may be formed by assembling together various components with methods well known to those skilled in the art.

Each pole piece 3A (see FIG. 1B), in the case of an electro-permanent dual magnet apparatus, comprises at least:
- one pole piece collector 5,
- one reversible permanent magnetic core 4 and
- one electric coil 3 (also known as solenoid) for changing the magnetization state of the reversible permanent magnetic core 4, which extends around the reversible permanent magnetic core 4.

Particularly, it can be seen from such FIG. 1B that the electric coils 3 have such a configuration as to define a space for receiving the reversible permanent magnet 4, such as a magnet of the AlNiCo type, above which the pole piece collector 5 is placed.

Furthermore, the pole pieces 3A may also comprise one or more static magnets 9, e.g. made of ferrite or NdFeB, also suitably oriented, that can generate an additional permanent magnetic field for clamping the ferrous element P.

Still with reference to FIGS. 1A and 1B, it can be noted that the pole piece collector 5 of each pole piece 3A consists of a substantially parallepipedal ferromagnetic piece having a square plan shape.

It shall be noted that, as used herein, the term pole piece collector 5 is intended to indicate an element that has one side 5A whose surface is magnetically neutral when the magnetic apparatus 1 is inactivated and magnetically active when the magnetic apparatus 1 is activated.

Thus, in other words, the pole piece collector 5 may have four of its six surfaces in which the magnetic field is oriented in one direction, the fifth surface in which the direction of the magnetic field can be changed into a polarity that is identical or opposite to the magnetic field in the other four surfaces and a sixth surface 5A, which is:
- magnetically neutral when the magnetic field generated on the fifth surface has a polarity opposite to the magnetic field of the other four surfaces (the magnetic apparatus is inactive) or
- magnetically active when the magnetic field generated on the fifth surface has the same polarity as the magnetic field of the other four surfaces (the magnetic apparatus is activated).

In short, the pole piece collector 5 is an element designed to convey the magnetic flux generated by the reversible permanent magnetic core 4 to the surface 5A to form the magnetic clamping surface 2A.

It shall be noted that the surfaces 5A of the "N" pole piece collectors 5 form together the magnetic clamping surface 2A for firmly clamping the ferrous elements P to be machined and/or for other operations.

In other words, when the apparatus 1 is in the active state, the surfaces 5A of the "N" pole piece collectors 5 are activated to magnetically clamp the ferrous elements P.

It should be further noted that the term activate/inactivate, concerning the magnetic apparatus, is intended to indicate the possibility of changing the magnetization state of the reversible permanent magnet 4 by the action of a suitable electromagnetic field generated by the electric coil 3.

Then, the process includes the step of associating the pole pieces 3A with the housing 2, for example, by means of a screw 6 received in a suitable hole 7, so that the solenoid 3-reversible magnet 4 assembly can be clamped into a pack.

Particularly, each pole piece collector 5, which is known to be a separate element, is accommodated within the housing 2 and fastened to its bottom 2B by the screw 6.

The screw 6 is usually placed in a central position relative to the pole piece collector 5.

Nevertheless, by simply fastening the pole piece collector 5 to the bottom 2B of the housing 2, there is no guarantee that the pole piece collector will maintain its stability during machining of the clamped workpiece P.

Indeed, the pole piece collectors 5 of each pole piece 3A are very sensitive to vibrations produced during machining of the clamped workpiece P, which cause detrimental effects in terms of accuracy and life of the magnetic clamping apparatus.

Furthermore, pole extensions 14 may be respectively associated with one or more pole pieces 3A, when the use of such extensions is specifically needed for machining the ferrous elements P.

The use of pole extensions 14 increases the mechanical stresses induced on the respective pole piece collectors 5, because they somewhat act as lever arms and further enhance vibrations.

Furthermore, a filling step 10 is also provided, whereby the magnetic apparatus 1 can be made substantially impervious to impurities and/or liquid infiltrations, and any gaps can be filled.

An exemplary material to be used for filling is resin 100.

The clamping surface 2A so obtained is cohesive but is formed using several different types of materials.

Thus, the clamping surface 2A is made from both the ferromagnetic material that forms each pole piece collector 5 and the filling material that surrounds such pole piece collector 5.

This results in a different sturdiness of the clamping surface 2A, mainly due to the filling material (such as resin); resin is less resistant and affects the overall sturdiness of the clamping surface 2A and sets the limit of the stresses that can be exerted on the workpiece P to be machined.

Furthermore, the difference among the thermal expansion coefficients of the materials that form the clamping surface 2A affects the quality and accuracy of machining of the ferrous workpieces P as the operating temperature of the magnetic apparatus 1 and the temperature of the clamping surface 2A change.

However, the bottom 2B of the housing 2 of the magnetic apparatus 1 is formed from one type of material, e.g. ferromagnetic material.

This imparts greater sturdiness to the bottom 2B as compared with the clamping surface 2A, because the monolithic ferromagnetic material is more resistant than the assembly of different materials that forms the clamping surface 2A.

Therefore, the bottom 2B of the housing 2 has a higher strength than the clamping surface 2A.

In order to partially compensate for the poorer strength of the clamping surface 2A, the housing 2 of the magnetic apparatus 1 must be strengthened, e.g. by forming ribs and/or increasing the thickness of the bottom 2B.

The problems of poorer mechanical strength and stability of the clamping surface 2A cannot be eliminated even when, for example, ribs are formed and/or the thickness of the bottom 2B is increased, because such measures have no effect on the poor stability conditions of the pole piece collector.

However, the provision of ribs reduces the magnetically active area of the clamping surface 2A, and a greater thickness of the bottom 2B increases the amount of material required for forming the magnetic apparatus 1, wherefore the useful space available to the machine tool for machining the workpiece to be machined is reduced.

It should be further noted that the stresses generated during machining can cause fractures in the filling material 100 with time.

This may cause infiltrations of cooling liquids, which may reach the electric coils 3 and generate short-circuits.

Furthermore, considering that each pole piece collector 5 is only retained by one screw 5 received in an appropriate hole 7, so that the solenoid 3-reversible magnet 4 assembly can be assembled into a pack, the pole piece collector 5 has a poor ability to withstand mechanical stresses generated during machining of ferrous workpieces.

The above clearly shows that, both for the manufacturers of magnetic apparatus for clamping ferrous elements, and for the users thereof, the need is strongly felt for quicker, simpler and more reliable assembly processes as well as for more resistant and reliable magnetic apparatus.

BRIEF SUMMARY OF THE INVENTION

Therefore, the present invention is based on the issue of providing a magnetic apparatus for clamping ferrous work pieces, that has such structural and functional characteristics as to fulfill the above needs, while obviating the above prior art drawbacks.

This issue is addressed by a magnetic apparatus for magnetically clamping ferrous elements as defined in claim 1.

The issue is also addressed by a process for making a magnetic apparatus for magnetically clamping ferrous elements.

The present invention provides a monolithic magnetic apparatus that affords significant damping of the mechanical vibrations transmitted by the machine tool to the ferrous workpiece being machined and imparts enhanced mechanical stability.

Also, the present invention provides a magnetic apparatus whose clamping surface is entirely made of metal, and can also reduce vibrations between the clamping surface and the workpiece to be machined.

Furthermore, the present invention further allows one piece of ferromagnetic material to be used for forming what is obtained in prior art from a number of separate workpieces, thereby affording machining time savings.

Further time savings are also achieved during mounting, because a single piece is handled, and no screw tightening operations are required.

Also, the magnetic apparatus so obtained is effectively protected from liquid infiltrations near the electric coils, because the monolithic structure creates a continuous metal surface.

Finally, in addition to easy fitting of the static magnet in the receptacle formed by coring, this process provides a single independent pole piece, not bound by specific dimensions, such as the distance and the vertical/horizontal orientation of the various pole pieces and allowing for any desired pole piece arrangement.

Further features and advantages of the magnetic apparatus of the present invention will appear from the following description of one preferred embodiment thereof, which is given by way of illustration and without limitation with reference to the accompanying figures, in which:

DETAILED DESCRIPTION OF THE INVENTION

The present invention will be described hereinafter with reference to a magnetic apparatus of the electro-permanent dual-magnet type, but similar results will be achieved using a permanent magnet or an electromagnetic apparatus.

Referring to the annexed FIGS. 2A to 2E, numeral 10 generally designates a magnetic clamping apparatus according to a first embodiment of the present invention.

Figure 2A:
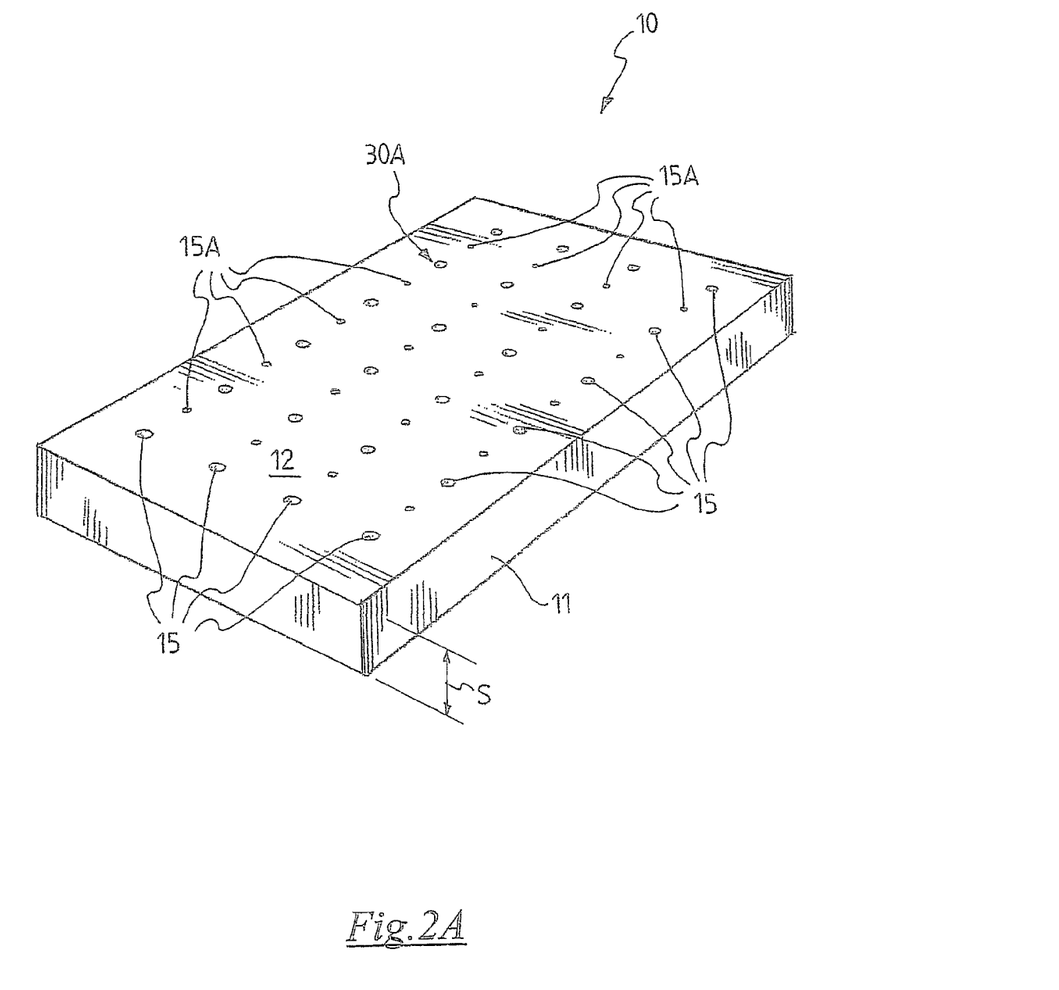
FIG. 2A is a perspective view of a first embodiment of the magnetic apparatus.
Figure 2B:
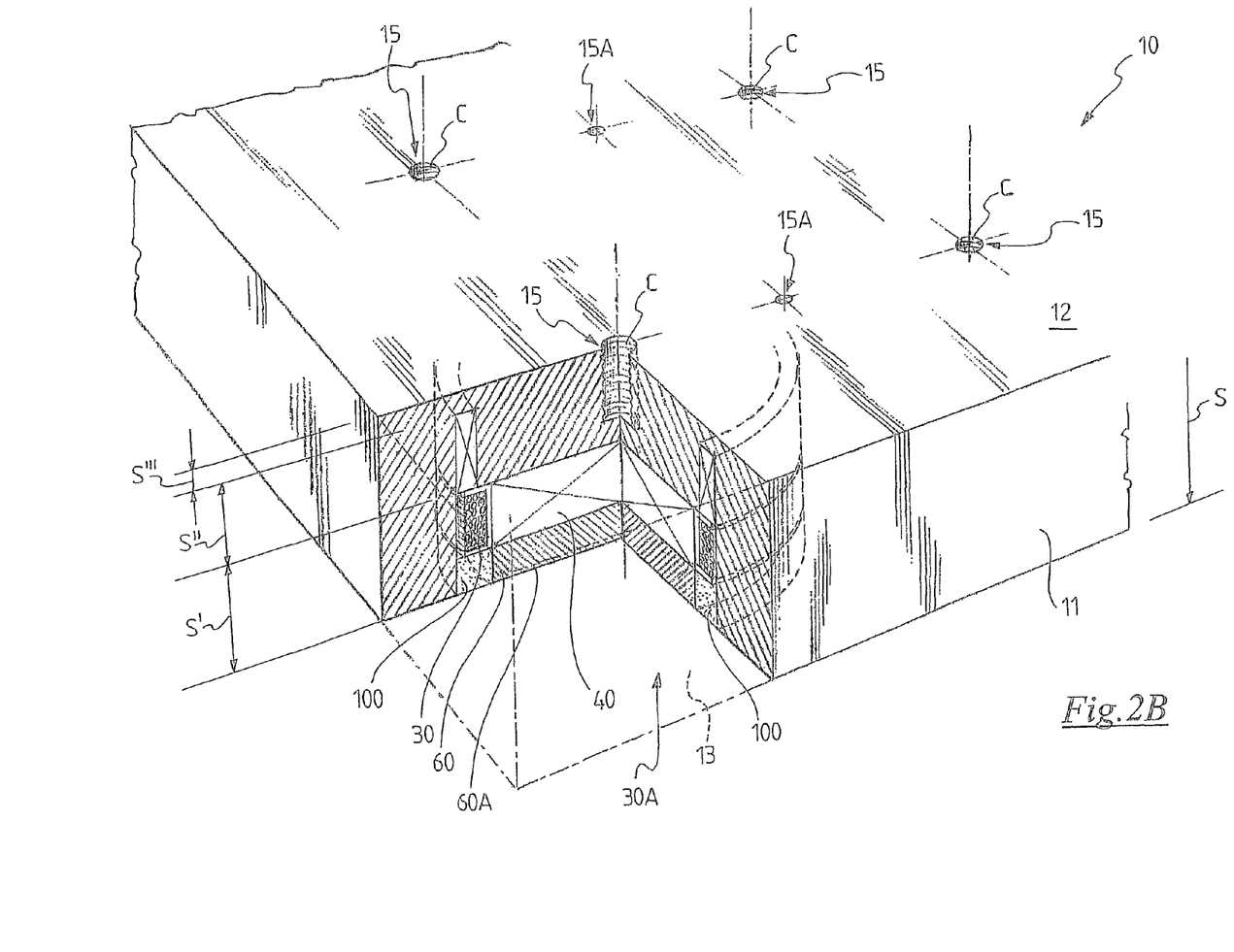
FIG. 2B is a partially sectional perspective view of the magnetic apparatus of FIG. 2A.

The magnetic apparatus 10 comprises a support structure 11, having at least one pole piece 30A within its thickness S.

This support structure 11 has at least one receptacle or recess R for accommodating the pole piece 30A.

Preferably, the magnetic apparatus comprises a plurality "N" of pole pieces 30A, each being accommodated in its respective recess R.

Particularly, the support structure 11 is formed with respective first and second sides 12, 13 at the opposite larger surfaces.

Preferably, the first and second sides 12, 13 extend parallel to each other, thereby defining respective surfaces.

As better explained hereafter, the surface defined by the first side 12 acts as a clamping surface for magnetically clamping a ferrous element P1 to be machined, whereas the surface defined by the second side 13 acts as a base for the magnetic apparatus and/or as an additional clamping surface for magnetically clamping an additional ferrous element P2 as long as certain conditions are fulfilled.

It shall be noted that one pole piece 30A has at least one respective pole piece collector 50, a lateral portion 50A whereof forms a portion of said first side 12.

Preferably, the plurality N of pole pieces 30A include each one respective pole piece collector 50, so that all the lateral portions 50A can form the clamping surface of the magnetic apparatus 10.

Figure 2C:
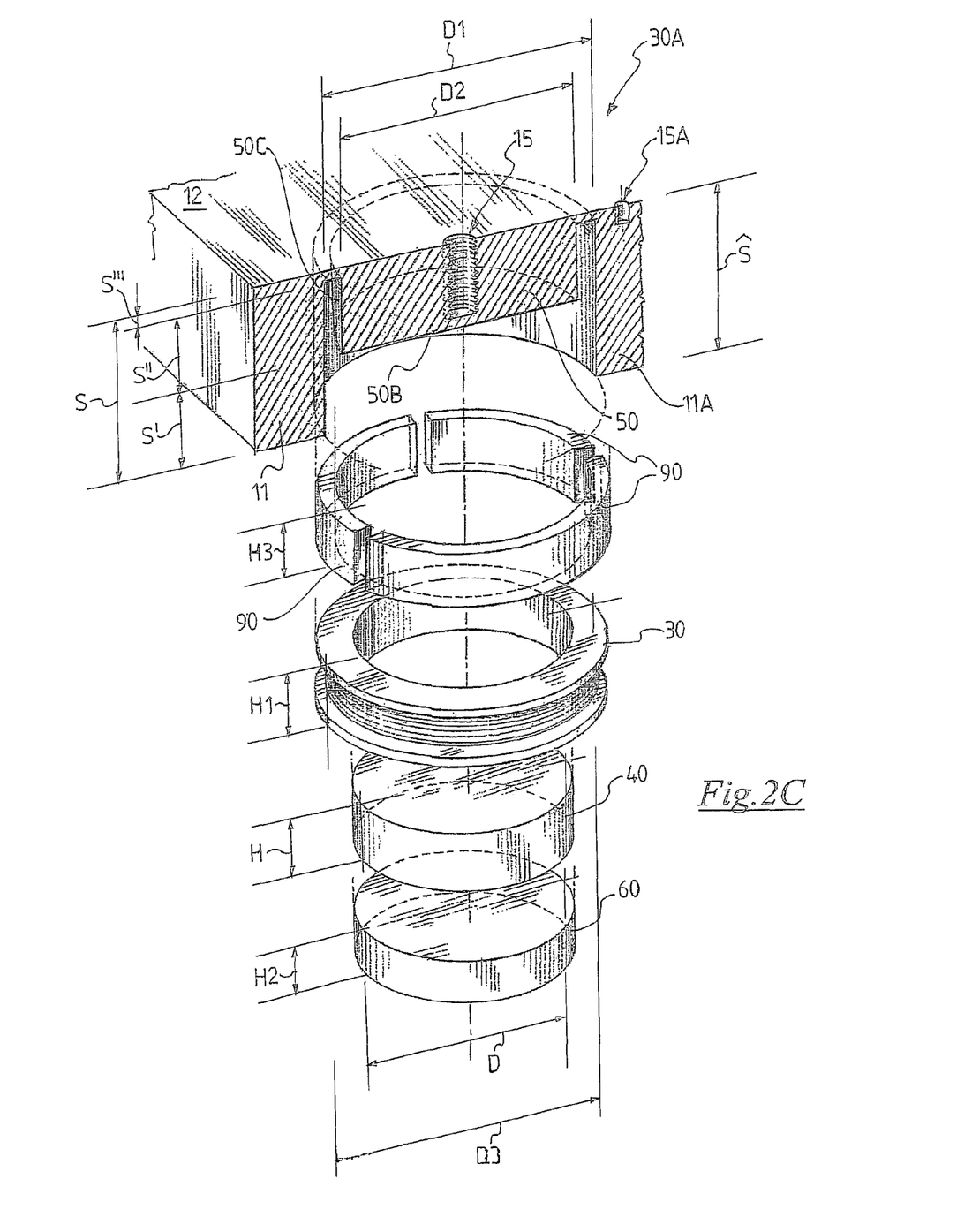
FIG. 2C is an exploded view of the devices that form the pole piece of the magnetic apparatus of FIG. 2A.

Referring now to FIGS. 2B and 2C, i.e. a partially sectional view of the magnetic apparatus 10 and an exploded view of a pole piece unit 30A respectively, it can be seen that such pole piece unit 30A further comprises a magnetic core 40, such as a reversible permanent magnetic core, and an electric core 30 for changing the magnetization state of the reversible permanent magnetic core 40.

For example, the reversible permanent magnetic core 40 is embodied by a AlNiCo magnet.

Still referring to FIGS. 2B and 2C it can be further seen that the pole pieces 30A can include additional magnetic cores 90, such as magnetic cores of the permanently magnetized non-reversible type.

The non-reversible magnetic cores 90, such as those made of ferrite or NdFeB are suitably oriented and placed proximate to the lateral faces 50C of the first pole piece collector 50.

Also, the pole piece 30A also comprises a ferromagnetic element 60 that is designed to be placed against the first magnetic core 40 for filling the gap that remains after introducing the first magnetic core 40 in the recess R and the electric core 30 against the bottom 50B of the first collector 50.

Particularly, a lateral portion 60A of the ferromagnetic element 60 forms a portion of the second side 13.

Furthermore, still with reference to FIGS. 2B and 2C, a gap tilting step is provided, for covering the electric core 30 and also ensuring cohesion of the ferromagnetic element 60, the first magnetic core 40 and the electric core 30, for instance by casting of resin 100.

Therefore, the resin 100 is designed to ensure unlosable of these elements and imperviousness to impurities and/or liquid infiltrations in the zone of the electric core 30.

In the preferred embodiment of the magnetic apparatus 10, these elements that form the pole piece 30A are embodied by elements of circular plan shape.

Advantageously, the first pole piece collector 50 is advantageously formed of one piece with the support structure 11, to create a monolithic magnetic apparatus 10A.

Figure 2D:
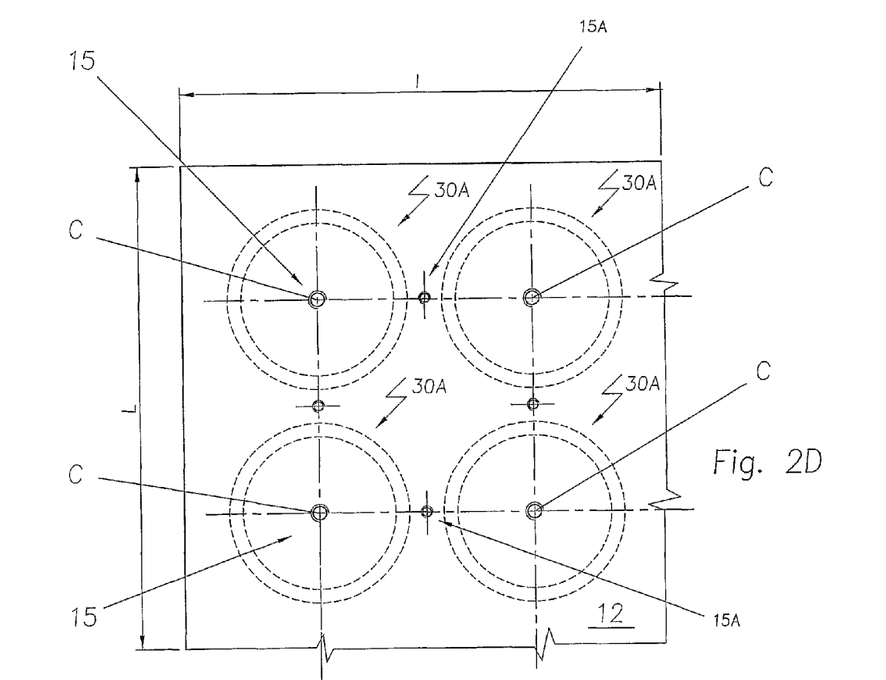
FIGS. 2D and 2E are a plan view and a sectional view of the support structure of the magnetic apparatus of FIG. 2A respectively.
Figure 2E:
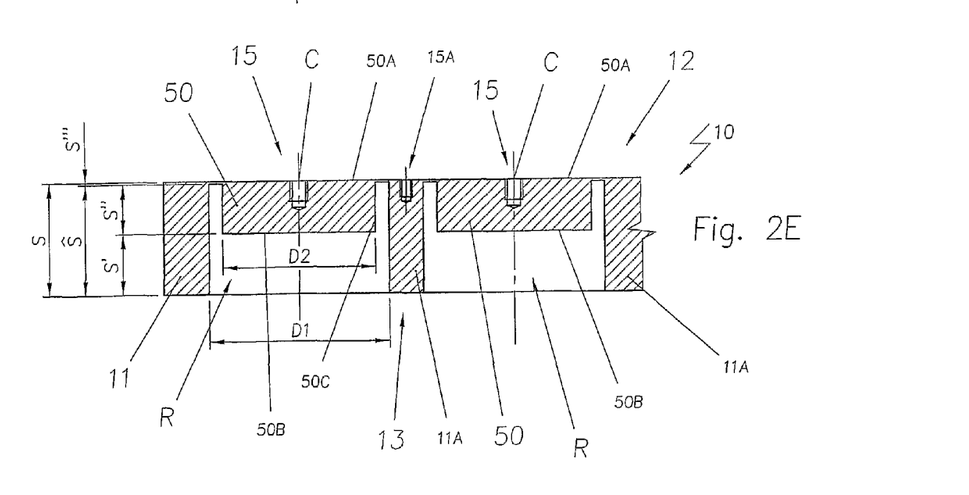

Thus, as shown in FIGS. 2B, 2C and 2E, the first pole piece 50 is part of the support structure 11.

For this purpose, the recesses (or receptacles) R are held within the thickness S of the support structure 11 and are part of the support structure.

Particularly, also referring to FIGS. 2C and 2E, the recesses R have a particular shape, including:
 a first portion of the recess R having a diameter D1 and a depth S', determined from the surface of the second side 13, and
 a second portion of the recess R having an outside diameter equal to the diameter D1 of the first portion of the recess and an inside diameter D2 and a depth $\hat{S}$ determined from the surface of the second side 13, so that said second portion forms an annular ring-shaped cavity.

Particularly, such annular ring has a depth S" equal to the difference between the depth $\hat{S}$ of the second portion of the recess R and the depth S' of the first portion of the recess R.

In other words, in a preferred aspect of the magnetic apparatus 10:
 in addition to forming the bottom 50B of the first pole piece collector 50, the first portion of the recesses R also receives the magnetic core 40, the electric coil 30 for changing the magnetization state of the magnetic core 40 and the ferromagnetic element 60; and
 in addition to forming the lateral surface 50C of the collector 50, which extends in a direction transverse to the lateral portion 50A, the second portion of the recesses R also receives the non-reversible permanent static magnets 90.

Therefore, the first pole piece collector 50 is advantageously formed of one piece with the support structure 11.

Indeed, the first collector 50 is integral with the support structure through a thickness S''' defined by the following relation:

$$S''' = S - \hat{S}$$

where:
S is the thickness of the support structure 11,
$\hat{S}$ is the depth of the recess R, which means that the depth $\hat{S}$ is equal to the sum of the depth S' of the first portion of the recess R and the depth S" of the annular ring.

In short, the first pole piece collector 50 is formed of one piece from the structure 11 and is monolithic therewith.

The support structure 11 so obtained inherently creates stiffening ribs 11A of the apparatus 10 and forms a honeycomb-like structure.

Concerning the elements that may form the pole piece 30A, it shall be noted that, in the preferred embodiment of the magnetic apparatus 10, besides being of circular shape, the above elements shall also be arranged to be entirely held within the thickness $\hat{S}$ of the recess R and in the diameter D1.

For this purpose, also with reference to FIG. 2C:
 the magnetic core 40 is embodied by a cylindrical body having a height H and a diameter D,
 the electric coil 30 is embodied by an annular element having a height H1 and an outside diameter D3 and an inside diameter slightly greater than the diameter D, such that the magnetic core 40 can be enclosed,
 the ferromagnetic element 60 is embodied by a cylindrical body having a height H2 and a diameter that may be equal to D, i.e. the diameter of the magnetic core 40.

However, concerning the magnetic core 90, this is preferably held within the depth S" of the annular ring.

Particularly, the magnetic core 90 is embodied by a plurality of portions whose composition forms an annular element. Such annular element has a height H3 that is equal to or smaller than the depth S" and outside and inside diameters equal to or slightly smaller than the outside diameter D1 and the inside diameter D2 of the second portion of the recess R.

Particularly, as shown in the annexed figures, connection of the elements that form the pole piece 30A does not require screw fasteners, because the stronger mechanical stresses generated during machining are withstood by the first side 12 of the magnetic apparatus which is sturdier than the second side 13.

Figure 4:
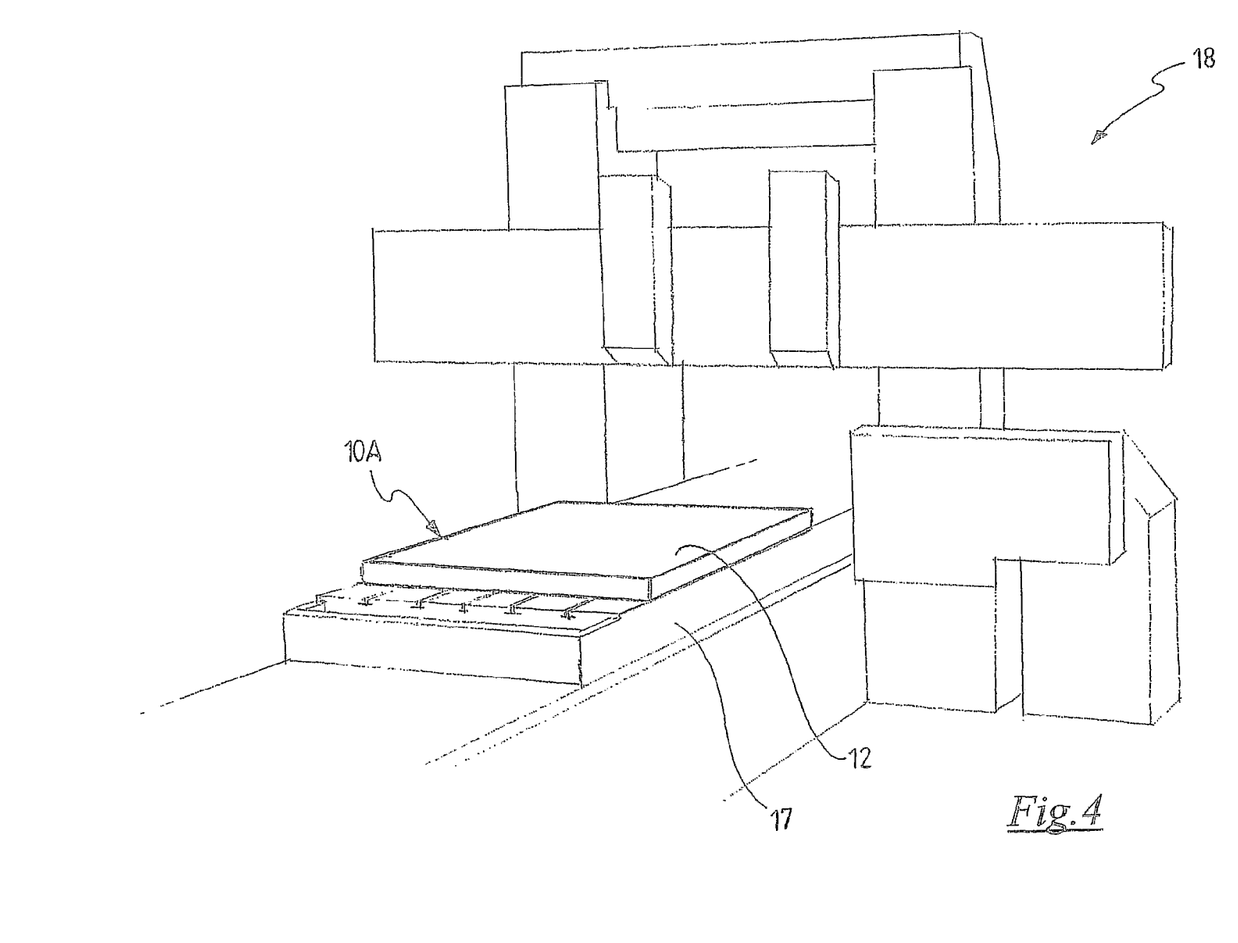
FIG. 4 shows a possible condition of use of the magnetic apparatus that are shown with reference to FIG. 3A.

Use of screw fasteners in the pole pieces 30A can be avoided because cohesion is ensured by the filling material (such as resin) applied to the second side 13; such filling material is sufficient to withstand the minor mechanical stresses exerted on such second side 13 which is always firmly coupled to a work surface (see surface 17), of the type as shown with reference to FIG. 4.

Also, the lack of screw fasteners advantageously allows use of a solid magnetic core 40 in the pole piece 30A.

This results either in considerably increased performances of the magnetic apparatus 10 or savings in the amount of magnetic material required for making said magnetic core 40.

It should be also noted that the monolithic design of the first collector 50 with the structure 11 allows the magnetic apparatus 10 to better distribute the mechanical stresses, as compared with the embodiment as shown in FIGS. 1A and 1B.

Therefore, the support structure 11 so defined allows a more effective absorption of the stresses and vibrations arising during machining of the workpiece (not shown).

It shall be further noted that the "N" pole pieces 30A may be freely arranged within the structure 11, i.e. without following a predetermined geometric pattern.

Nonetheless, according to a preferred embodiment, the "N" pole pieces 30A are arranged within the structure 11 according to a predetermined pattern in which the "N" pole pieces 30A are arranged according to a matrix pattern.

Preferably, in this matrix pattern of the "N" pole pieces 30A, the center C lies along the lines and/or columns that form the matrix.

Also, according to the usual modes of use of the apparatus 10, blind holes 15 may be formed at the center C of the pole piece collector 50.

Preferably, these blind holes 15 may be wither threaded blind holes or filled with a separate threaded insert of the helicoil type.

An accessory may be associated with the threaded blind hole 15 for easier machining, such as the shank of a pole extension (not shown).

Particularly, if the threaded blind holes 15 are formed at the center C of a pole piece 30A and the pole pieces 30A are arranged in matrix pattern, then such threaded blind holes 15 are aligned along predetermined axes that are parallel to the axes of a reference system with orthogonal cartesian axes X-Y.

Also, the support structure 11 comprises an additional plurality of blind holes 15A which are located on the first side 12 of the apparatus 10.

Particularly, the blind holes 15A are interposed between the "N" pole pieces 30A.

If the "N" pole pieces 30A are arranged in matrix pattern, then such blind holes 15A are aligned along predetermined orthogonal Cartesian axes X-Y.

Advantageously, the blind holes 15A are formed on the first side 12 with centesimal resolution with respect to a reference point such as an apex of the magnetic apparatus 10A, to form a reference mask.

The presence of the additional blind holes 15A advantageously facilitates proper positioning of the ferrous workpieces being machined or provides an absolute reference for machining to be carried out on the ferrous workpieces by a machine tool.

Furthermore, these holes 15 and 15A may be formed with different boring diameters to more easily determine which holes are designed to receive the accessories and which ones are designed to be reference holes.

It shall be further noted that, in addition to the monolithic support structure feature, the magnetic apparatus 10 also has the feature that the surface defined by the first side 12 is a so-called "entirely ferromagnetic clamping surface".

In other words, the clamping surface formed by the first side 12 is advantageously arranged to contain no filling material.

This aspect is highly advantageous in that the lack of resin or other material (such as brass) on the clamping surface ensures that no failure, deformation (such as peeled off resin) occurs in case of machining processes that involve an increase of the clamping surface temperature.

In other words, the surface of the first side 12 is a flat surface formed of one material, such as the material that forms the support structure 11 of the magnetic apparatus 10 as well as the material that forms each pole piece collector 50 of the pole pieces 30A.

Therefore, in the specific embodiment of the magnetic apparatus 10, the clamping surface defined by the first side 12 appears as a continuous ferromagnetic surface in which no separate pole piece zones are visible, excepting the holes 15 and/or 15A.

It shall be noted that such continuous ferromagnetic surface has an improved performance when holding small workpieces, because the continuous ferromagnetic surface helps to more effectively distribute the magnetic flux and make it available even where this was not possibly before.

Referring now particularly to FIGS. 2D and 2E, it can be noted that the support surface 11 of the magnetic apparatus 10 is formed from a ferromagnetic plate of predetermined width L, length l and with a thickness equal to the thickness S of such structure 11.

In the specific view of FIG. 2E, the support structure 11 has two recesses R for accommodating the elements that form the pole pieces 30A.

It should be noted that the first portion of the recesses R may be obtained by material removal using a milling machine, whereas the second portion of the recesses R may be obtained using a corer.

This tool is usually employed to make receptacles for O-Rings or to form large-diameter through holes by very little material removal with apparent time and machine power savings.

However, in this specific case, a number of coring steps are carried out on the above ferromagnetic plate, to delimit the lateral surface 50C of the pole piece collector 50 that extends in a direction transverse to the lateral surface 50A.

In other words, the coring steps are successively repeated to define the annular ring that forms the second portion of the recesses R.

Particularly, the coring process advantageously allows the depth Ŝ of the recess R to be at least twice the difference between the outside diameter D1 and the inside diameter D2.

It will be appreciated, anyway, that the process for forming the recess R by coring is more cost-effective than ordinary turning, milling or boring, if the difference between the outside diameter D1 and the inside diameter D3 of the recess R not greater than 6 mm.

This provides considerable savings in terms of manufacturing costs for the magnetic apparatus, because:

the amount of ferromagnetic material to be removed for forming the apparatus may reach values about 50% smaller than the amount of material removed from the magnetic apparatus according to the prior art;

the amount of ferromagnetic material required for forming the apparatus may reach values about 35% smaller than the amount required according to the prior art.

Also, it shall be appreciated that, if the first collector 50 is formed of one piece with the support structure 11, there will be no need to individually form and handle the pole piece collectors.

This affords considerable savings in terms of times for assembly and calibration of the magnetic apparatus.

Advantageously, the coring process that is carried out to obtain the second portion of the recesses provides a pole piece collector 50 of a single and independent pole piece 30A, with the consequent advantage of not being bound by specific dimensions, such as the vertical/horizontal distance between the pole pieces 30A or the single pole piece 30A.

Figure 2F:
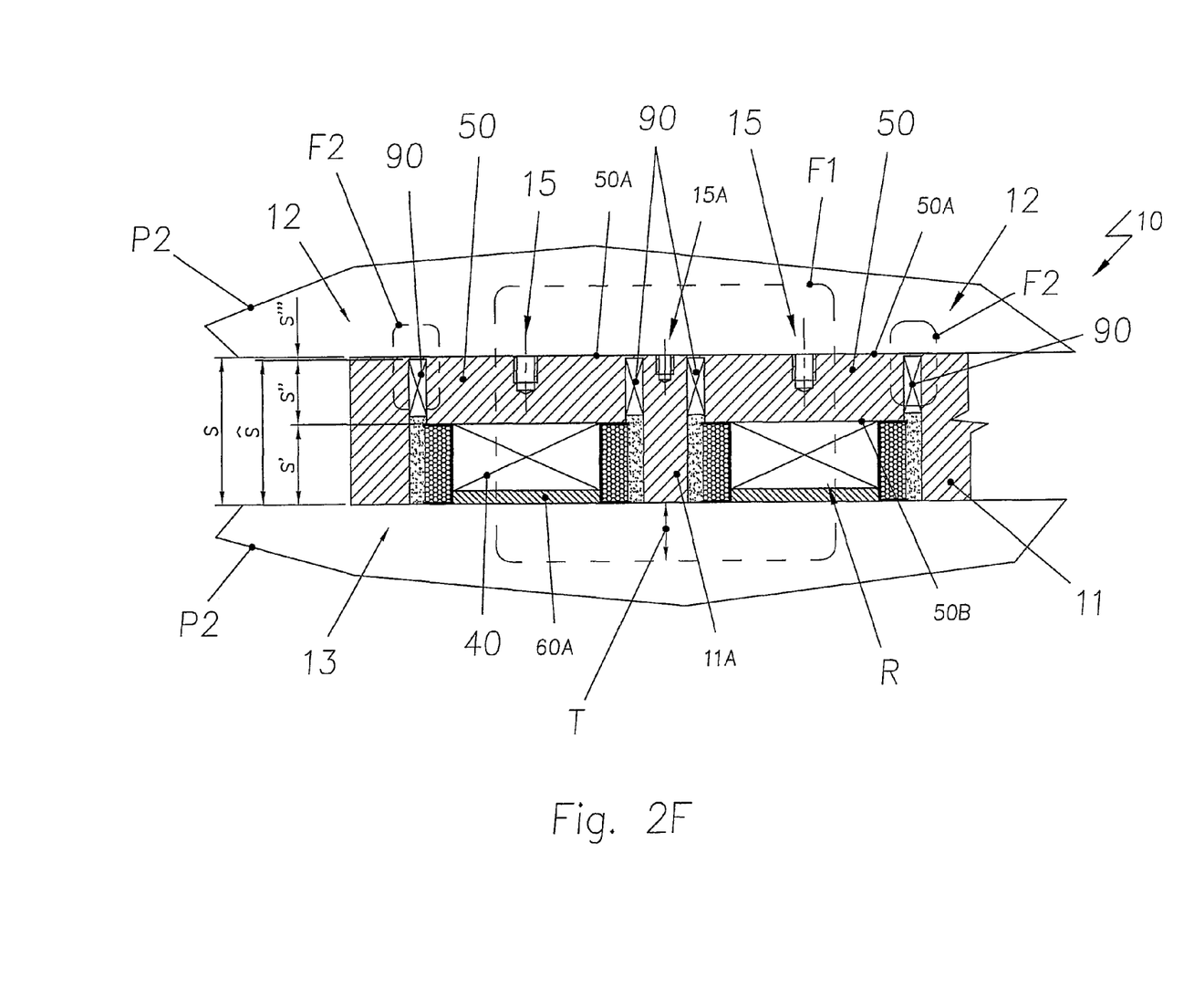
FIG. 2F is a sectional view of the magnetic apparatus of FIG. 2A with both surfaces magnetically active.

Referring now to FIG. 2F, the magnetic apparatus 10 as described above is shown in the operating state in which both sides 12 and 13 are magnetically active and hence in the self-clamping configuration.

Thus, the magnetic apparatus 10 may be implemented such that both the clamping surface 12 and the bearing surface 13 can be magnetically activated.

This is possible when the ferromagnetic element 60 is formed in such a manner as to be able to convey the whole or most of the magnetic flux generated by the magnetic cores 40 also through said ferromagnetic element 60.

In this situation, magnetic pole pieces can be provided on the second side 13 of the magnetic apparatus 10 proximate to the second pole piece 60, which make the surface of such second side 13 magnetically active and thus adapted for self-clamping of ferrous elements on the surface of such second side 13.

If the magnetic apparatus 10 is of the self-clamping type, then the ferromagnetic element 60 is embodied by a second pole piece collector.

In this situation, it shall first be noted that the pole pieces 30A generate at least one first magnetic flux F1 on such first side 12, when the magnetic apparatus 10A is active.

Such magnetic flux F1 can magnetically clamp first ferrous elements, e.g. placed in contact with the surface of the first side 12.

Advantageously, the first magnetic flux F1 defines an additional magnetic clamping surface at the second side 13, for magnetically clamping second ferrous elements P2.

In other words, when the magnetic apparatus 10 is in an operating state, the pole pieces 30A generate at least the same magnetic flux F1 adapted to ensure magnetic clamping of second ferrous elements P2.

Thus, at least the first magnetic flux F1 is emitted from the second side 13 to a predetermined field depth T.

It shall be noted that, as used herein, the term field depth T is intended to indicate the minimum thickness of the ferromagnetic material required for the magnetic flux to be wholly short-circuited between two different pole pieces 30A.

Particularly, the magnetic field generated by the magnetic apparatus 10 from the surface of the side 13 and emitted from said second side 13, may have a field depth T that is at the most equal to the maximum linear dimension of the second pole piece collector 60.

It shall be noted that the term maximum linear dimension of the second pole piece collector 60 is intended to indicate the maximum thickness and/or diameter value:

Therefore, a magnetic flux may be generated from the surface of the side 13, having such a field depth T as to generate a sufficient magnetic force to firmly secure a ferrous element P2 to the magnetic apparatus 10.

Furthermore, the magnetic cores 90 are able to generate a second magnetic flux F2 on such first clamping side 12, so that said first ferrous elements P1 can be magnetically clamped by said first flux F1 and said second flux F2.

Thus, in the above self-clamping configuration, a sufficient magnetic force may be provided on the second side 13, for clamping the magnetic apparatus 10 to a machine tool bed, one typical operating configuration whereof is shown in FIG. 4.

It shall be noted that the term sufficient magnetic force for clamping the magnetic apparatus 10 to the machine bed is intended to indicated a force value at least 15% higher than the maximum force that such magnetic apparatus 10 can exert from the first side 12 on the workpiece being machined.

It shall be noted that, again in this embodiment, the lateral portion 60A of such second pole piece collector 60 forms a portion of the second side 13.

Figure 3A:
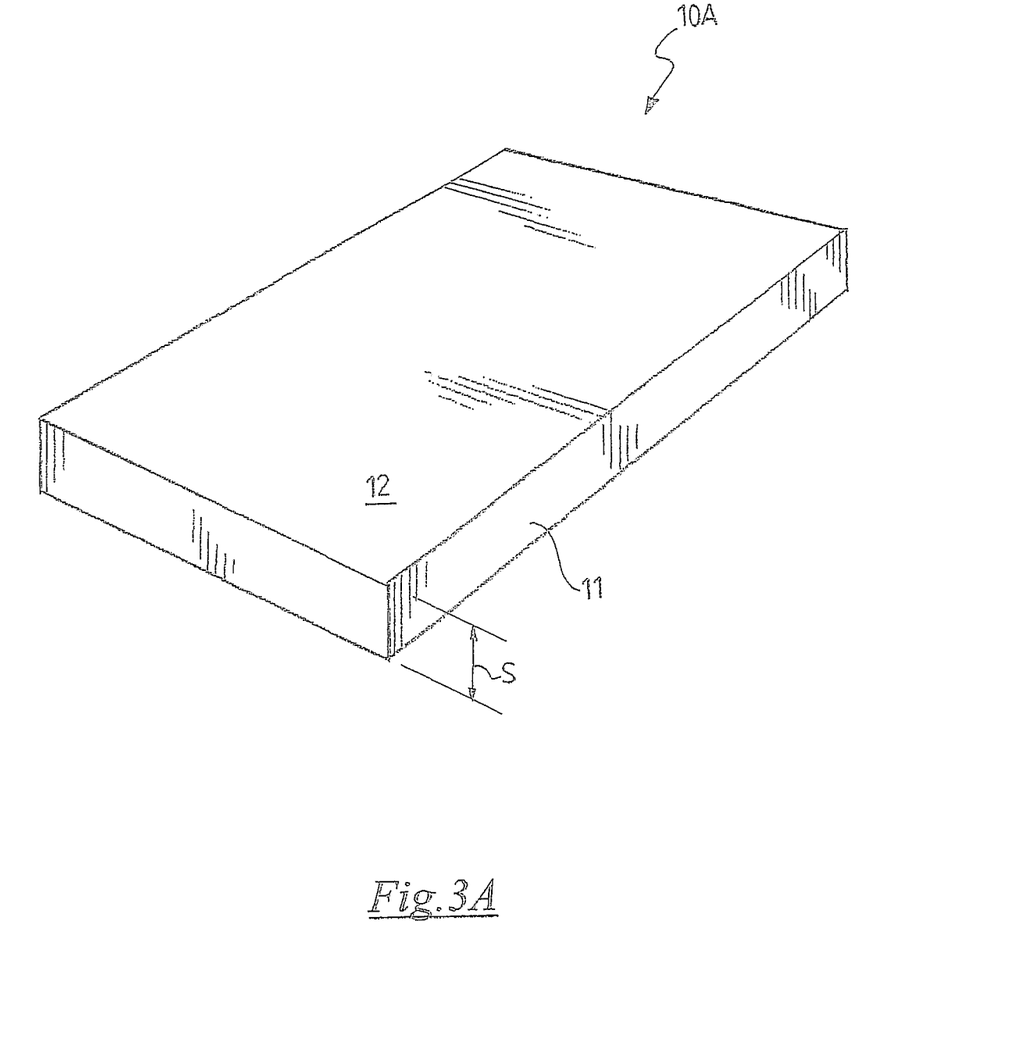
FIG. 3A is a perspective view of a second embodiment of the magnetic apparatus.
Figure 3B:
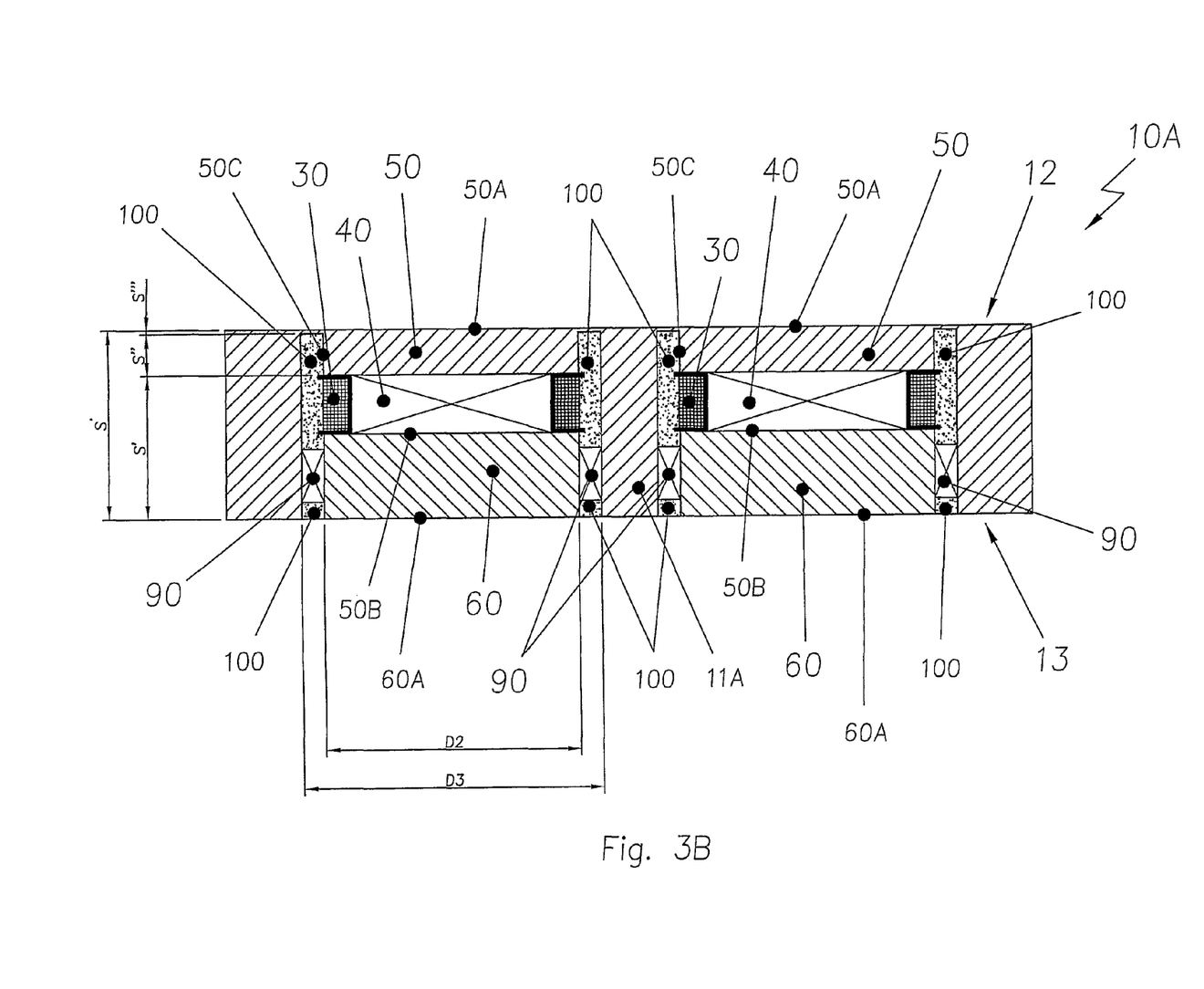
FIG. 3B is sectional view of the magnetic apparatus of FIG. 3A.

Referring now to FIGS. 3A and 3B, there is shown a second embodiment of a magnetic apparatus 10A, in which previously described elements are designated by identical reference numerals.

Unlike the embodiment as described above with reference to FIGS. 2A to 2E, the magnetic apparatus 10A does not have the blind holes 15 for association of pole extensions.

It is further useful to note that, in this case, the second portion of the recesses R is not designed to contain the static magnet 90 but only serves to locate the lateral surfaces 50C of the first pole piece collector 50.

Particularly, the magnetic apparatus 10A of FIGS. 3A and 3B can be only formed in the self-clamping configuration.

Advantageously, in addition to the monolithic feature, the magnetic apparatus 10A also has the feature that the surface of the side 12 is an "entirely ferromagnetic clamping surface", i.e. a flat surface with no holes formed therein.

Advantageously, the clamping surface defined by the first side 12 is formed of one material, such as the material that forms the support structure 11 of the magnetic apparatus.

It shall be further noted that the magnetic apparatus 10 in the self-clamping configuration and the magnetic apparatus 10A previously described with reference to FIGS. 3A and 3B, under the same performance conditions, have a lower thickness S than prior art apparatus, due to the lack of the magnetic flux short-circuiting bottom of the apparatus.

Furthermore, the magnetic apparatus 10 in the self-clamping configuration and the magnetic apparatus 10A can increase the clamping force of the surface of the side 12, by increasing the number of pole pieces 30A that can be installed on the first side 12, because there is no longer the need of forming stiffening ribs on the housing 2 of the apparatus.

Otherwise, in another embodiment, the ferromagnetic element 60 may be also formed in such a manner as to short-circuit the whole or most of the magnetic flux generated by the magnetic cores 40, for the surface of said second side 13 to be magnetically neutral, i.e. a magnetic force value that is insufficient to clamp the magnetic apparatus 10A by its second side 13.

Referring now to FIG. 4, a possible operational configuration of the magnetic apparatus 10 or 10A is shown.

It shall be noted that, as shown in such FIG. 4, the second side 13 of the magnetic apparatus 10 or 10A may be magnetically held against a bed 18 of a machine tool, or mechanically secured by mechanical means interposed between the magnetic apparatus 10 or 10A and the machine bed.

In this embodiment of the magnetic apparatus 10 or 10A, when the ferrous element P1 is being machined, the provision of the magnetic apparatus 10 or 10A with a monolithic structure, and the provision of a clamping surface of the magnetic apparatus 10 or 10A that is an "entirely ferromagnetic clamping surface" prevent any undesired mechanical stresses on the side 12, thereby imparting increased resistance to the magnetic apparatus 10 or 10A and hence improving the accuracy with which the ferrous element P1 is machined.

As clearly shown in the above description, the magnetic apparatus of the present invention fulfills the above mentioned need and also obviates prior art drawbacks as set out in the introduction of this disclosure.

Those skilled in the art will obviously appreciate that a number of changes and variants may be made to what has been described hereinbefore, without departure from the scope of the invention, as defined in the following claims.

The invention claimed is:

1. A magnetic apparatus for magnetic clamping of ferrous elements, comprising:
   a support structure formed of ferromagnetic material having a predetermined width (L), length (l) and thickness (S);
   first and second sides being formed in said support structure at larger opposite surfaces;
   at least one pole piece comprising at least one first pole piece collector, a first magnetic core and an electric coil for changing a magnetization state of the first magnetic core, said at least first pole piece collector being adapted to convey at least one first magnetic flux generated by said magnetic apparatus to said first side;
   characterized in that said at least one pole piece is held within the thickness (S) of said support structure and said at least one first pole piece collector is formed of a single piece integrally with said support structure to create a monolithic magnetic apparatus and a continuous ferromagnetic surface on said first side.

2. A magnetic apparatus as claimed in claim 1, wherein a lateral portion of each at least one first pole piece collector forms a portion of said first side, said first side being a flat surface formed of said ferromagnetic material, so that said first side is an entirely metallic surface.

3. A magnetic apparatus as claimed in claim 1, wherein said support structure comprises at least one recess (R) held within the thickness (S) of said support structure.

4. A magnetic apparatus as claimed in claim 1, wherein said recess (R) comprises a first portion having a first depth (S') defined from the surface of said second side and a diameter, said first portion of said recess (R) forming a bottom of said first pole piece collector.

5. A magnetic apparatus as claimed in claim 1, wherein said pole piece comprises a ferromagnetic element, a lateral portion of said ferromagnetic element forming a portion of said second side, said electric coil for changing the magnetization state and said first magnetic core being interposed between a bottom of said first collector and said ferromagnetic element.

6. A magnetic apparatus as claimed in claim 5, wherein a first portion of said recess (R) is adapted to accommodate said ferromagnetic element, said first magnetic core and said electric coil for changing the magnetization state of said first magnetic core.

7. A magnetic apparatus as claimed in claim 1, wherein said at least one pole piece comprises second magnetic cores.

8. A magnetic apparatus as claimed in claim 7, wherein said second portion of said recess (R) is adapted to accommodate said second magnetic cores.

9. A magnetic apparatus as claimed in claim 7, wherein said first magnetic core is of the permanently magnetized and reversible type and said second magnetic core is a magnetic core of the permanently magnetized non-reversible type.

10. A magnetic apparatus as claimed in claim 1, wherein a plurality (N) of said at least one pole piece are arranged in said support structure to form a matrix having a predetermined number of rows and columns.

11. A magnetic apparatus as claimed in claim 1, wherein the pole pieces have a circular plan shape.

12. A process for making a magnetic apparatus according to claim 1, said process comprising the steps of:
   providing a plate of ferromagnetic material having a predetermined width (L), length (l) and thickness, said plate defining first and second sides at the opposed larger surfaces;
   characterized in that it includes the additional steps of:
   removing from said plate of ferromagnetic material such an amount of said ferromagnetic material, from the surface of said second side as to create at least one recess (R), wherein said recess (R) is formed of a first portion of predetermined depth (S') and diameter, said first portion of said recess (R) forming a bottom of a first pole piece collector,
   removing from said plate of ferromagnetic material an additional amount of said ferromagnetic material to form a second portion of said recess (R), said second portion of said recess (R) forming the lateral surface of said first pole piece collector,
   so that said first pole piece is formed of a single piece with said support structure.

13. A process for making a magnetic apparatus as claimed in claim 12, including the additional steps of:
   providing a first magnetic core;
   providing an electric coil;
   providing a ferromagnetic element wherein a lateral portion of said ferromagnetic element defines a portion of said second side;
   accommodating said first magnetic core and said electric coil, with the latter surrounding said first magnetic core, in said first portion of said recess (R), between the bottom of said first collector and said ferromagnetic element.

14. A process for making a magnetic apparatus as claimed in claim 13, including the additional steps of:
   providing a second magnetic core;
   accommodating said second magnetic core in said second portion of said recess (R).

15. A process as claimed in claim 13, including the additional step of filling the gaps by casting of resin.

16. A process as claimed in claim 12, wherein the step of removing an additional ferromagnetic material from said support structure of ferromagnetic material to form said second portion of said recess (R) is carried out using a corer.

17. A magnetic apparatus for magnetic clamping of ferrous elements, comprising:
   a support structure formed of ferromagnetic material having a predetermined width (L), length (l) and thickness (S);

first and second sides being formed in said support structure at larger opposite surfaces;

at least one pole piece comprising at least one first pole piece collector, a first magnetic core and an electric coil for changing a magnetization state of the first magnetic core, said at least first pole piece collector being adapted to convey at least one first magnetic flux generated by said magnetic apparatus to said first side;

characterized in that said at least one pole piece is held within the thickness (S) of said support structure and said at least one first pole piece collector is formed of one piece with said support structure to create a monolithic magnetic apparatus;

wherein said support structure comprises at least one recess (R) held within the thickness (S) of said support structure;

wherein said recess (R) comprises a second portion having a second depth (S) defined from the surface of said second side and an outside diameter equal to the diameter of the first portion of the recess and an inside diameter, said second portion of said recess (R) forming the lateral surface of said at least one first pole piece collector, said lateral surface extending transverse to said lateral portion.

18. A magnetic apparatus as claimed in claim 17, wherein the second depth (S) of said second portion of said recess (R) is at least twice the difference between the diameter of said first portion of said recess (R) and the inside diameter of said second portion of said recess (R).

19. A magnetic apparatus for magnetic clamping of ferrous elements, comprising:

a support structure formed of ferromagnetic material having a predetermined width (L), length (l) and thickness (S);

first and second sides being formed in said support structure at larger opposite surfaces;

at least one pole piece comprising at least one first pole piece collector, a first magnetic core and an electric coil for changing a magnetization state of the first magnetic core, said at least first pole piece collector being adapted to convey at least one first magnetic flux generated by said magnetic apparatus to said first side;

characterized in that said at least one pole piece is held within the thickness (S) of said support structure and said at least one first pole piece collector is formed of one piece with said support structure to create a monolithic magnetic apparatus;

wherein said pole piece comprises a ferromagnetic element, a lateral portion of said ferromagnetic element forming a portion of said second side, said electric coil for changing the magnetization state and said first magnetic core being interposed between a bottom of said first collector and said ferromagnetic element;

wherein said ferromagnetic element is a second pole piece collector which is designed to convey said at least one first magnetic flux to said second side, said ferromagnetic element having a diameter equal to the diameter (D) of said first magnetic core and a predetermined height.

20. A magnetic apparatus as claimed in claim 19, wherein, in at least one operating state of said magnetic apparatus, said at least one first magnetic flux defines a second magnetic clamping surface at said second side for magnetically clamping second ferrous elements, said at least one first magnetic flux coming out of said second side with a predetermined field depth (T).

21. A magnetic apparatus as claimed in claim 20, wherein the magnetic force required to firmly secure said second ferrous element against said second clamping surface of said second side is a force value at least 15% higher than the maximum force that such magnetic apparatus can exert upon the clamping surface of said first side.

22. A magnetic apparatus as claimed in claim 20, wherein said predetermined field depth (T) of said at least one first magnetic flux coming out of said second side is equal to or greater than the maximum linear dimension of said second pole piece collector, such field depth being adapted to firmly clamp said second ferrous elements.

23. A process for making a magnetic apparatus for magnetic clamping of ferrous elements, said apparatus comprising:

a support structure formed of ferromagnetic material having a predetermined width (L), length (l) and thickness (S);

first and second sides being formed in said support structure at larger opposite surfaces;

at least one pole piece comprising at least one first pole piece collector, a first magnetic core and an electric coil for changing a magnetization state of the first magnetic core, said at least first pole piece collector being adapted to convey at least one first magnetic flux generated by said magnetic apparatus to said first side;

characterized in that said at least one pole piece is held within the thickness (S) of said support structure and said at least one first pole piece collector is formed of one piece with said support structure to create a monolithic magnetic apparatus;

said process comprising:

providing a plate of ferromagnetic material having a predetermined width (L), length (l) and thickness, said plate defining first and second sides at the opposed larger surfaces;

characterized in that it includes the additional steps of:

removing from said plate of ferromagnetic material such an amount of said ferromagnetic material, from the surface of said second side as to create at least one recess (R), wherein said recess (R) is formed of a first portion of predetermined depth (S') and diameter, said first portion of said recess (R) forming a bottom of a first pole piece collector, removing from said plate of ferromagnetic material an additional amount of said ferromagnetic material to form a second portion of said recess (R), said second portion of said recess (R) forming the lateral surface of said first pole piece collector, so that said first pole piece is formed of one piece with said support structure, an outside diameter equal to the diameter of said first portion and an inside diameter and a depth (Ŝ) defined from the surface of said second side said depth (Ŝ) being at least twice the difference between the outside diameter equal to the diameter of said first portion and the inside diameter of said second portion of the recess (R).

* * * * *